Oct. 29, 1963
J. T. McNANEY
3,109,065
DECODER
Filed Feb. 19, 1960
3 Sheets-Sheet 1
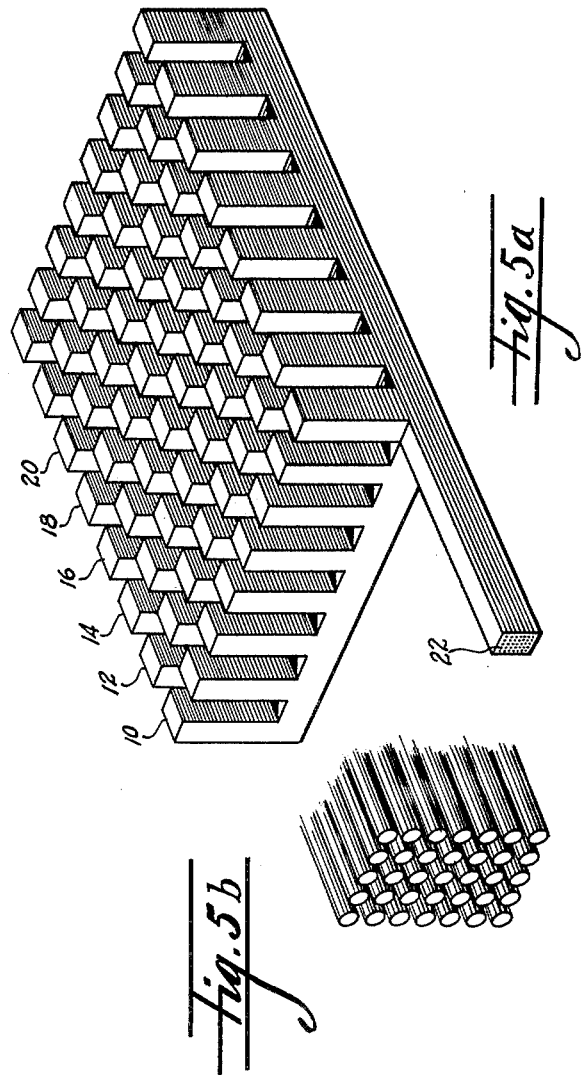
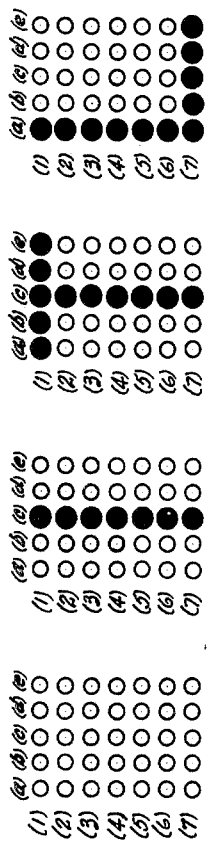
JOSEPH T. McNANEY
INVENTOR.
BY
Sidney Magnes

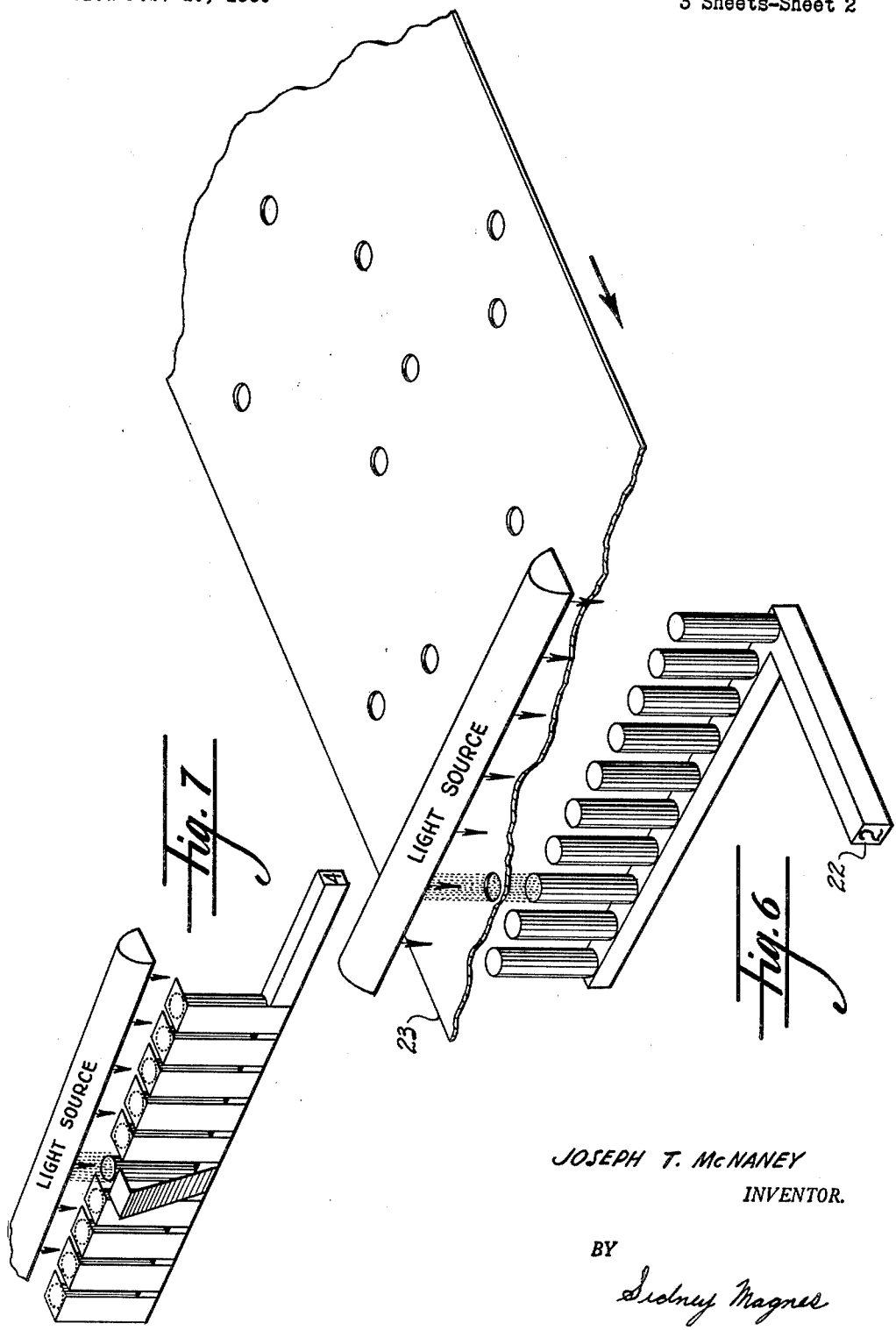

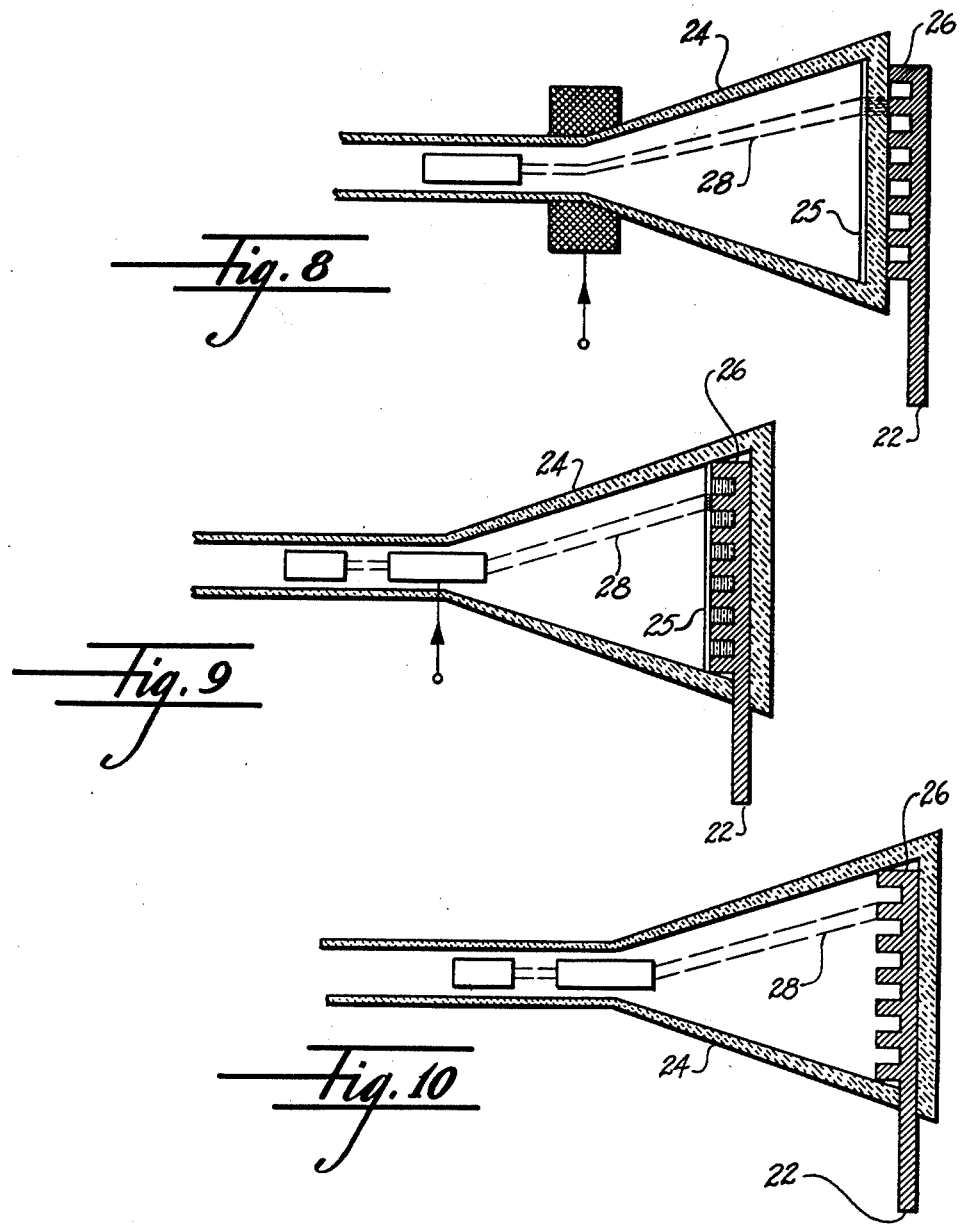

United States Patent Office 3,109,065
Patented Oct. 29, 1963

3,109,065
DECODER
Joseph T. McNaney, La Mesa, Calif., assignor to General Dynamics Corporation, Rochester, N.Y., a corporation of Delaware
Filed Feb. 19, 1960, Ser. No. 9,990
6 Claims. (Cl. 178—30)

This invention relates to a decoder, and more particularly to apparatus that decodes incoming signals and presents either a visible pattern, or an electrical recordation that can be converted to a visible display.

It is well known that messages and other types of information are often transmitted in the form of codes; which may be secret—as in military usage, or widely known—as in the telegraphic system. The output of various devices, such as computers, is also in the form of a code.

Once coded data has been received—regardless of its source, it must be decoded and printed or presented in some way so that an observer can read, understand, and evaluate it.

It is therefore the main object of my invention to provide a simple decoder.

It is another object of my invention to provide apparatus that converts coded data into characters or messages that are comprehensible to the human observer.

The attainment of these objects and others will be realized from the following specification taken in conjunction with the drawings of which:

FIGURES 1–4 illustrate a method of character presentation;

FIGURES 5a and 5b disclose my inventive concept;

FIGURES 6 and 7 show another embodiment of my invention; and

FIGURES 8, 9, and 10 show apparatus using my invention.

Broadly speaking, my invention uses a plurality of input matrices and an output matrix; corresponding elements of all the matrices being interconnected. By causing a coded input signal to energize a selected input matrix, the signal from the output matrix corresponds to a pre-selected character; thus automatically decoding the input signal, without the use of moving elements or complex circuitry.

It is well known that a plurality of elements, as for example lamps, can be arranged in such an array, or "matrix," that "characters"—as exemplified by letters, numbers, or symbols—can be produced by energizing particular ones of these elements. This principle, which is widely used in "changing" electrical signs and in various types of printing, may be understood from FIGURE 1. This drawing shows, for explanatory purposes only, an array of 35 elements—say lights—arranged in a 5 x 7 rectangle, or matrix. The vertical columns of this array are identified by the letters $a$, $b$, $c$, $d$, and $e$; and the horizontal rows of elements in the matrix are identified as 1, 2, 3, 4, 5, 6, and 7. If—as shown in FIGURE 2, elements $c1$, $c2$, $c3$, $c4$, $c5$, $c6$, and $c7$ are illuminated, they form a vertical line; and the lighted representation would be that of the letter "I."

As shown in FIGURE 3, energizing the elements $a1$, $b1$, $c1$, $d1$, $e1$, $c2$, $c3$, $c4$, $c5$, $c6$, and $c7$ produces a "T." In a similar way the letter "L" is produced in FIGURE 4 by energizing the following elements; $a1$, $a2$, $a3$, $a4$, $a5$, $a6$, $a7$, $b7$, $c7$, $d7$, and $e7$. Practically any letter, number, or symbol can be similarly produced.

While the above example has used a 5 x 7 matrix, this particular array is merely a compromise. An array using fewer elements can produce most of the desired characters, but some of them would be somewhat indistinct. On the other hand, a matrix having a greater number of elements would be able to produce much more distinct characters, but at the expense of complexity of the energizing circuitry.

The basic concept of my invention is shown in FIGURE 5, wherein a plurality of input matrices 10—20, etc., is shown. Assume for the moment that each of these input matrices has 35 elements in a 5 x 7 array, and that corresponding elements of all the matrices are connected to corresponding elements of output matrix 22. Thus all "$a1$" elements of the input matrices are connected to the "$a1$" element of the output matrix, the "$a2$" elements of the input matrices are similarly interconnected, etc. If now the proper elements of input matrix 10 are energized to form the letter "I," the output matrix 22 would also produce the letter "I." Similarly, if selected elements of matrix 12 are energized in the form of a "T," output matrix 22 would also produce a "T." In the same way, if selected elements of matrix 14 are energized to form an "L," output matrix 22 would produce an "L." In a like manner if the elements of another matrix were energized to produce an arrow, output matrix 22 would also produce an arrow. It is therefore apparent that if any input matrix is energized in the form of any character, letter, number, or symbol, a corresponding configuration would appear at output matrix 22.

In the interests of simplicity of explanation, the foregoing discussion implied that any matrix was capable of producing any character. If however, each matrix were to produce only its own particular character, only selected elements of each matrix are necessary. For example, if matrix 10 were to produce only an "I," only the previously listed elements are necessary. Similarly, if matrix 12 were to produce only a "T," only selected elements would be needed. In a like manner, the other input matrices would require particular elements.

I propose therefore, that each input matrix produce only a given character; that the unnecessary elements of each input matrix be omitted; and that the required elements be bundled together into as small an area as possible. Output matrix 22 would however, contain all the elements necessary for all the desired characters; 35 in the above example. As a result, energizing the face of input matrix 10 would automatically produce the letter "I" on output matrix 22; energizing matrix 12 would produce the letter "T" at the output matrix; and energizing the exposed elements of input matrix 14 would produce the letter "L" at output matrix 22. In this way, since each input matrix has only the elements that are necessary to produce its individual character, the overall structure may be formed into a small compact unit.

My inventive concept may be used in different ways, one of which is shown in FIGURE 6. This embodiment is shown as having 10 input matrices, and one output matrix, the elements of the input matrices being selected to produce numbers 0–9. In FIGURE 6 the matrix elements are light "pipes" or guides which receive light at one end and emit it at the other. When light is directed toward a mask 23, such as a perforated moving tape, the emergent light beam sequentially impinges on selected input matrixes. As previously explained, output matrix 22 produces visible characters that correspond to the position of the perforations. These characters may be photographed, or recorded on a suitable record medium—as for example by xerography.

Alternatively, lights fixedly positioned above selected input matrices may be subsequentially illuminated by coded signals. These would cause selected characters to appear in a character-at-a-time sequence at the ouput matrix.

In the embodiment of FIGURE 7, each input matrix has its own individual mask, which is moved by any suitable actuating device. Incoming signals energize selected actuators, thus exposing selected matrices to the light—and cause the output matrix to display a corresponding character.

In FIGURE 8, another embodiment is shown, this one using electrical input signals and a cathode ray tube. As shown, a conventional cathode ray tube 24 has on the inner surface of its faceplate a fluorescent screen 25 that produces light at the point of electron beam impingement. In this embodiment the target 26 is positioned adjacent the external surface of the tube's faceplate, and comprises light guides arranged similarly to the one previously described. When electron beam 28 is positioned so that it impinges on an area of the fluorescent screen opposite a particular input matrix, the light from the fluorescent screen enters that matrix. The cathode ray tube, thus replaces the apertured tape or the masking shields previously shown. As previously described, the light guide elements of each input materix are so chosen that the output matrix presents the desired characters. Sequential positions of the electron beam, as controlled by input signals applied to the deflection system, cause the output matrix to produce sequential light patterns that can be imaged onto a photographic film, a viewing screen, a light directing arrangement, or any other suitable utilization device. The individual input matrices of target 26 are, of course positioned to correspond with the code.

In FIGURE 9 the target is positioned within the cathode ray tube, and fluorescent screen 25 positioned in close proximity therewith.

FIGURE 10 shows a cathode ray tube that has a target comprising wires—rather than light guides—that are connected as previously explained. In this embodiment, no fluorescent screen is used. The incoming signals again position the electron beam so that it impinges upon a given input matrix, and the electrons accumulate on corresponding wires of output matrix 22 to produce a potential pattern representative of the character corresponding to the input matrix energized. The potential pattern at output matrix 22 can then be used to produce an electrical recordation—such as a discoloration of a chemically treated paper, or a charge pattern that can be treated to produce a visible display of the corresponding character. The electron beam is sequentially repositioned, so that the output matrix sequentially produces a series of characters.

It may thus be seen that one embodiment of my invention uses a perforated mask whose position coded perforations produce corresponding visible output characters. Another embodiment uses fixedly positioned lights. A further embodiment uses a coded electrical input signal, applies it to a cathode ray tube that positions the electron beam in accordance with the input coded signal, and causes the position of electron beam to produce at the output matrix either a lighted pattern that can be recorded, or a pattern of potentials that can produce an electrical recordation on a recording medium.

In the cathode ray tube, the electron beam may be positioned in any of a number of ways. For example, positioning signals may be applied to a standard deflection system, as shown in FIGURE 8. Alternatively, as indicated in FIGURE 9, the incoming signal may be in code form and a "weighted" deflection system may be used to automatically position the electron beam. In either case, the coded incoming signals position the electron beam so that it energizes a predetermined input matrix of the target, and thus produces a selected character at the output matrix. Thus, the coded input signal is automatically decoded into an intelligible message.

The invention illustrated and described herein is illustrative only and the invention includes such other modifications and equivalents as may occur to those skilled in the art within the scope of the appended claims.

The embodiments of the invention in which an exclusive property or privilege is claimed are defined as follows:

1. A decoder comprising a source of information, a plurality of information input matrices, each of said matrices having a plurality of conductive elements bundled together so as to provide a compact unit, means coupled to said source of information for selectively energizing on a sequential basis individual ones of said input matrices in response to the information received from said source, said selective energizing means comprising a source of light, said energizing means serving to energize simultaneously all of the conductive elements of the selected input matrix, an output matrix having conductive elements arranged in a given pattern, means for utilizing information represented by energized conductive elements of said output matrix, and means individually associated with each of said input matrices for interconnecting conductive elements of the corresponding input matrix and given ones of the conductive elements of said output matrix, each of said conductive interconnecting means being independent of the other conductive interconnecting means, said conductive elements and said interconnecting means each comprising light guides, said given ones of said conductive elements being located in said pattern so as to define a predetermined character shaped pattern, said predetermined pattern being different for each one of said input matrices whereby selective energization of said input matrices generates corresponding character shaped patterns of energized conductive elements in said output matrix.

2. A decoder comprising a source of information, a plurality of information input matrices, each of said matrices having a plurality of conductive elements bundled together so as to form a compact unit, means coupled to said source of information for selectively energizing on a sequential basis individual ones of said input matrices in response to the information received from said source, said selective energizing means comprising a source of light, said energizing means serving to energize simultaneously all of the conductive elements of the selected input matrix, an output matrix having conductive elements arranged in a given pattern, means for utilizing information represented by energized conductive elements of said output matrix, and means individually associated with each of said input matrices for interconnecting conductive elements of the corresponding input matrix and given ones of the conductive elements of said output matrix, each of said conductive interconnecting means being independent of the other conductive interconnecting means, said conductive elements and said interconnecting means each comprising light guides, said source of information including an aperture mask interposed between said light source and said light guides of said input matrix, said mask being movable with respect to said light guides to selectively control their energization by said light source, said given ones of said conductive elements being located in said pattern so as to define a predetermined character shaped pattern, said predetermined pattern being different for each one of said input matrices whereby selective energization of said input matrices generates corresponding character shaped patterns of energized conductive elements in said output matrix.

3. A decoder for providing a visible display in response to coded incoming information comprising a plurality of information input matrices, each of said input matrices having a plurality of distinctively arranged light guides, the arrangement of said light guides corresponding to a distinct character, means for selectively energizing with light on a sequential basis individual ones of said input matrices in accordance with the incoming information, said energizing means serving to energize simultaneously all of the light guides of the selected input matrix, an output matrix including a compact bundle of light guides arranged in a given pattern, a plurality of independent interconnecting means each including a group of light guides individually associated with each of said input matrices for interconnecting light guides of the corresponding input matrix and given ones of the light guides of said output matrix, said given ones of said light guides of said output matrix so interconnected being located in said pattern so as to define a predetermined visible character shaped pattern, said predetermined pattern being different for each one of said input matrices whereby selective energization of said input matrices generates corresponding character shaped patterns of energized light guides in said output matrix.

4. The combination of claim 1 in which said selective energizing means comprises a plurality of individually operable masks, one associated with each of said light guides for selectively blocking or admitting light to the corresponding one of said light guides, and said source of information comprises a source of signals for controlling the operable position of each of said masks.

5. The combination of claim 1 in which said selective energizing means further comprises a cathode ray tube having a fluorescent screen to provide said source of light, said input matrices being positioned to receive light emanating from said screen, and means for deflecting the electron beam in said tube to control the position of the light emanating from said screen, said source of information comprising a source of signals connected to control said deflecting means.

6. The combination of claim 1 in which said selective energizing means further includes a cathode ray tube having a target area, said conductive elements of said input matrices forming a portion of said target area, means for deflecting the electron beam in said tube to control the energization of the conductive elements of said input matrices, said source of information comprising a source of signals connected to control said deflecting means.

References Cited in the file of this patent
UNITED STATES PATENTS

| | | |
|---|---|---|
| 2,841,461 | Gleason | July 1, 1958 |
| 2,848,638 | Smith | Aug. 19, 1958 |
| 2,881,976 | Greanias | Apr. 14, 1959 |
| 2,912,511 | McKim | Nov. 10, 1959 |
| 2,921,300 | Zipf | Jan. 12, 1960 |
| 2,947,813 | Valensi | Aug. 2, 1960 |
| 2,951,121 | Conrad | Aug. 30, 1960 |
| 2,973,506 | Newby | Feb. 28, 1961 |
| 2,981,140 | Ogle | Apr. 25, 1961 |
| 2,982,951 | Dirks | May 2, 1961 |
| 3,012,839 | Epstein et al. | Dec. 12, 1961 |